(12) United States Patent
Southern

(10) Patent No.: US 10,595,667 B2
(45) Date of Patent: Mar. 24, 2020

(54) COFFEE TAMPER

(71) Applicant: CLOCKWORK ESPRESSO LTD., Tyne & Wear (GB)

(72) Inventor: Peter Southern, Tyne & Wear (GB)

(73) Assignee: CLOCKWORK ESPRESSO LTD., Tyne & Wear (GB)

( * ) Notice: Subject to any disclaimer, the term of this patent is extended or adjusted under 35 U.S.C. 154(b) by 277 days.

(21) Appl. No.: 15/513,084

(22) PCT Filed: Sep. 22, 2015

(86) PCT No.: PCT/EP2015/071750
§ 371 (c)(1),
(2) Date: Mar. 21, 2017

(87) PCT Pub. No.: WO2016/046207
PCT Pub. Date: Mar. 31, 2016

(65) Prior Publication Data
US 2017/0280925 A1 Oct. 5, 2017

(30) Foreign Application Priority Data

Sep. 22, 2014 (GB) .................................. 1416726.6

(51) Int. Cl.
*A47J 31/44* (2006.01)
*A47J 31/36* (2006.01)
*A47J 31/00* (2006.01)
*B30B 1/00* (2006.01)

(52) U.S. Cl.
CPC ............... *A47J 31/44* (2013.01); *A47J 31/00* (2013.01); *A47J 31/3671* (2013.01); *B30B 1/00* (2013.01)

(58) Field of Classification Search
CPC ... B30B 9/3053; B30B 9/3021; B65F 1/1405; B65F 1/1415; B65F 1/06; B65F 1/00
USPC ......................................................... 100/265
See application file for complete search history.

(56) References Cited

U.S. PATENT DOCUMENTS

| | | | | |
|---|---|---|---|---|
| D348,590 S | * | 7/1994 | Scott | D7/387 |
| D375,233 S | * | 11/1996 | Hirsch | A47J 31/44 |
| | | | | D7/682 |
| 5,636,563 A | * | 6/1997 | Oppermann | A47J 31/24 |
| | | | | 99/285 |
| 6,044,754 A | * | 4/2000 | Fuentes | A47J 31/0668 |
| | | | | 99/295 |

(Continued)

FOREIGN PATENT DOCUMENTS

| | | | |
|---|---|---|---|
| AU | 2010101102 A4 | * 11/2010 | ......... A47J 31/3671 |
| AU | 2012209041 A1 | * 2/2013 | |

(Continued)

OTHER PUBLICATIONS

DE-202013003598-U1, Pyttel, George, with ESPACENET translation.*

(Continued)

Primary Examiner — Teresa M Ekiert
Assistant Examiner — Sarkis A Aktavoukian
(74) Attorney, Agent, or Firm — Jones Robb, PLLC

(57) ABSTRACT

The invention relates to a coffee tamper. More specifically, the invention relates to a device for tamping coffee grounds in a basket or portafilter of an espresso machine, by which device a reproducible pressure is applied to the coffee grounds and which is designed to reduce occupational-related diseases among professional users, like e.g. baristas.

16 Claims, 3 Drawing Sheets

(56) References Cited

U.S. PATENT DOCUMENTS

| | | | |
|---|---|---|---|
| D493,338 S * | 7/2004 | Scott | D7/682 |
| 7,325,491 B2 * | 2/2008 | Petiziol | A47J 31/44 100/219 |
| D648,982 S * | 11/2011 | Jokuszies | D23/252 |
| 9,392,900 B2 * | 7/2016 | McLean | A47J 31/20 |
| 9,402,501 B1 * | 8/2016 | Vu | A47J 31/3623 |
| D810,521 S * | 2/2018 | Kunlun | D7/682 |
| 2003/0096038 A1 * | 5/2003 | Cai | A47J 31/14 426/77 |
| 2004/0206243 A1 * | 10/2004 | Foster | A47J 31/44 99/279 |
| 2005/0132890 A1 * | 6/2005 | Constantine | A47J 31/44 99/275 |
| 2011/0209623 A1 * | 9/2011 | Leung | A47J 31/44 99/287 |
| 2014/0356502 A1 * | 12/2014 | Goeltenboth | A47J 31/0663 426/433 |
| 2015/0135968 A1 * | 5/2015 | Gort-Barten | A47J 31/0673 99/295 |
| 2016/0051081 A1 * | 2/2016 | Grassia | A47J 31/404 99/280 |
| 2016/0145038 A1 * | 5/2016 | Apone | B65D 65/466 426/115 |
| 2016/0150909 A1 * | 6/2016 | Rivera | A47J 31/0647 99/287 |
| 2016/0157661 A1 * | 6/2016 | Torquemada | A47J 31/0657 99/323 |
| 2017/0361961 A1 * | 12/2017 | Rivera | B65B 29/02 |
| 2018/0055274 A1 * | 3/2018 | Landau | A47J 31/38 |
| 2018/0313394 A1 * | 11/2018 | Beardmore | F16B 35/041 |

FOREIGN PATENT DOCUMENTS

| | | | | |
|---|---|---|---|---|
| AU | 2014100166 A4 * | 3/2014 | | |
| AU | 2014100166 A4 | 3/2014 | | |
| AU | 2015202411 A1 * | 11/2015 | | |
| AU | 2012209041 B2 * | 4/2016 | | |
| CA | 2490500 A1 * | 6/2005 | | A47J 31/44 |
| CN | 202932757 U * | 5/2013 | | |
| CN | 106073506 A * | 11/2016 | | |
| CN | 108078389 A * | 5/2018 | | |
| DE | 202013003598 U1 * | 10/2013 | | A47J 31/44 |
| DE | 202016008589 U1 * | 7/2018 | | A47J 31/44 |
| KR | 20060084961 A * | 7/2006 | | |
| KR | 200440510 Y1 * | 6/2008 | | |
| KR | 20120040499 A * | 4/2012 | | |
| KR | 101171108 B1 * | 8/2012 | | |
| KR | 20130037893 A * | 4/2013 | | |
| KR | 101479006 B1 * | 1/2015 | | |
| KR | 101756121 B1 * | 7/2017 | | |
| KR | 101846185 B1 * | 4/2018 | | |
| KR | 20180067173 A * | 6/2018 | | |
| KR | 20180102759 A * | 9/2018 | | |
| TW | M417110 U1 | 12/2011 | | |
| WO | WO-2016019418 A1 * | 2/2016 | | A47J 31/44 |
| WO | WO-2017118484 A1 * | 7/2017 | | A47J 31/44 |

OTHER PUBLICATIONS

International Search Report for corresponding International Patent Application No. PCT/EP2015/071750, dated Nov. 2, 2015.

Written Opinion of the International Searching Authority for corresponding International Patent Application No. PCT/EP2015/071750, dated Nov. 2, 2015.

International Preliminary Report on Patentability for corresponding International Patent Application No. PCT/EP2015/071750, dated Apr. 6, 2017.

Dainty et al., Prevalence of occupation related pain among baristas and an examination of low back and shoulder demand during the preparation of espresso-based beverages, Ergonomics, 57:8, 11921200, ISSN 0014-0139, Aug. 26, 2014.

"Londinium espresso—for lovers of premium coffee brewed on lever espresso machines," Londinium Expresso, <https://web.archive.org/web/20131230094456/http://londiniumespresso.com>, retrieved Jan. 21, 2019, pp. 1-5.

Diane E. Gregory, PhD, "An Ergonomic Evaluation of the Push tamper: Espresso tamping while using a traditional tamper and the Push tamper," pp. 1-22, Study Conducted at Wilfrid Laurier University, Waterloo, Ontario, Canada, May 15, 2016.

* cited by examiner

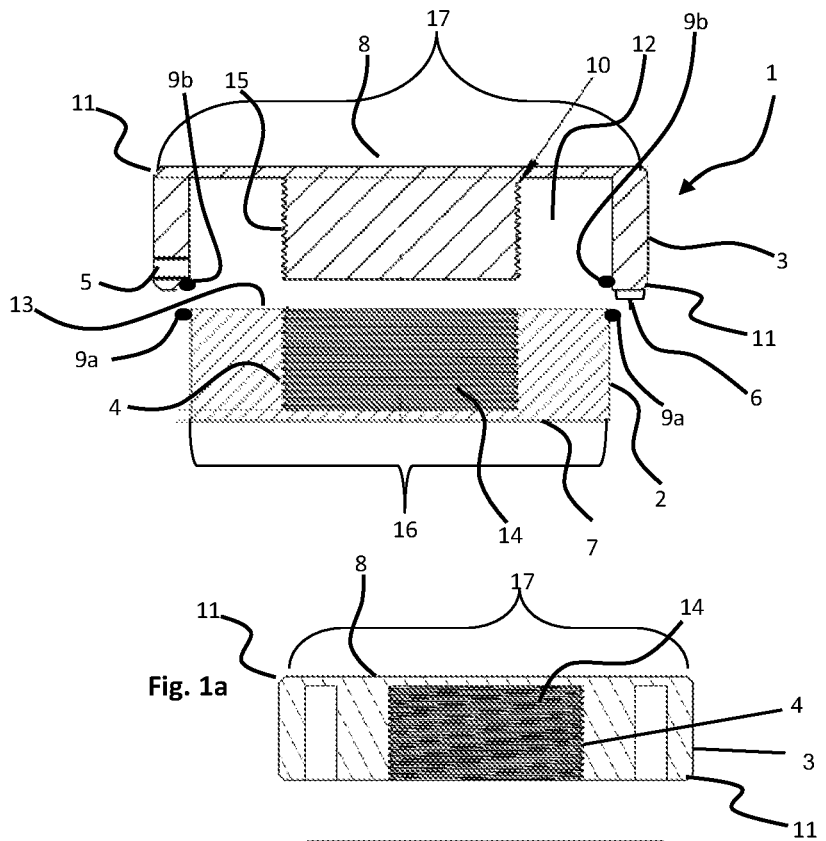
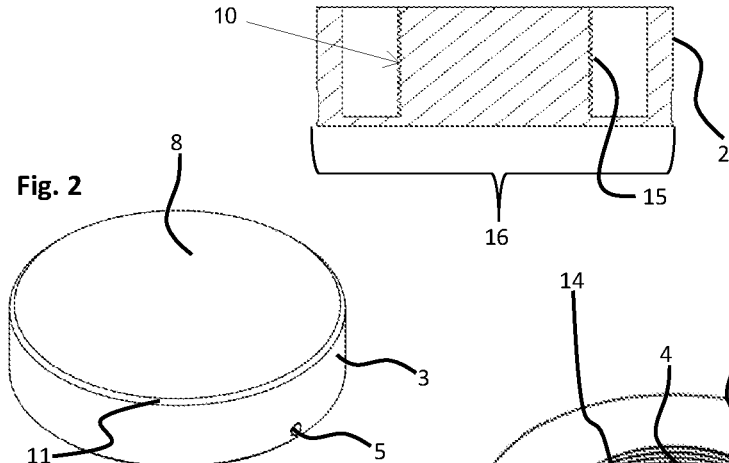

COFFEE TAMPER

This is a national stage application of International Application No.: PCT/EP2015/071750, filed internationally on Sep. 22, 2015, which claims priority to Great Britain Application No. GB 1416726.6, filed Sep. 22, 2014, the entire disclosures of each of which are incorporated herein by reference.

The invention relates to a coffee tamper. More specifically, the invention relates to a device for tamping coffee grounds in a basket or portafilter of an espresso machine, by which device a reproducible pressure is applied to the coffee grounds and which is designed to reduce occupational-related diseases among professional users, like e.g. baristas.

Coffee is a worldwide well known beverage which has been consumed by mankind for more than 1000 years, starting in late $10^{th}$ century in Ethiopia. In general, there are three main ways to prepare a coffee beverage. The oldest one is to grind the coffee beans and to boil up the coffee grounds in water. The second one is to use a filter, like e.g. a cloth or a filter paper, load the filter with coffee grounds and pour on boiling water. The third one is to prepare the coffee beverage by pressure extraction, like it is used when preparing an espresso.

The preparation of espresso coffee involves running of heated water under pressure through compressed coffee grounds in a basket or portafilter. It is well known that within the process of preparing an espresso beverage different variables may influence the quality and/or the overall result of the beverage. These variables are the type of coffee used, the grain size of the coffee grounds, the amount of coffee grounds per cup, the temperature of the water, the pressure of the extraction, and the quantity of water. A further important variable is the pressure used to compress the coffee grounds in the basket or portafilter. Since each of these variables affect the quality of the espresso beverage and to gain reproducible results, all of these variables have to be kept within small variation ranges, only. When using commercial/professional espresso making equipment most of these variables are easily controllable, like e.g. the coarseness settings of the coffee grounds, the dosage, the water temperature, the water pressure, and the water volume. However, the compression of the coffee grounds in the basket or portafilter and the surface of the compressed cake of coffee grounds are subject to high variations or a high level of variation.

The compression of the coffee grounds in the basket or portafilter is known as tamping. The tool used to compress the coffee grounds is commonly known as a coffee tamper or tamper. Types of tampers known in the art are, e.g. handheld manual tampers, fixed tamping surfaces mounted on the coffee grinders, or tamping machines which exert force by a lever. Especially for non-professional or semi-professional use most of these tampers have ornamental character, too, and the ergonomic handling of the same is of minor interest.

However, when used in professional environment, like e.g. coffee shops, bars and restaurants, where a huge number of espresso beverages are prepared over a working day, ergonomic handling is very important.

Many baristas complain of low back pain (LBP) and upper extremity discomfort while at work. A study documented the prevalence of LBP and shoulder pain, via questionnaire, among a population of baristas to determine whether cumulative low back loads and shoulder moments are associated with pain reporting. Fifty-nine baristas completed the questionnaire; ten were also video-recorded for biomechanical analysis while making espresso beverages and cumulative and peak low back loads and shoulder moments were calculated. Seventy-three percent of those who completed the questionnaire reported having experienced LBP, and half attributed this pain to their job as a barista. Furthermore, 68% reported having experienced shoulder pain and half also attributed this pain to their job. Those who suffered from LBP had higher peak low back compression and those with shoulder pain had, in general, higher moments about their dominant shoulder (R. Scott Dainty, Eric Alcorn, Chantelle A. Ferguson & Diane E. Gregory (2014), *Prevalence of occupation related pain among baristas and an examination of low back and shoulder demand during the preparation of espresso-based beverages*, Ergonomics, 57:8, 1192-1200, ISSN 0014-0139).

In view of the above it is the object of the invention to provide a tamping device for the preparation of espresso beverages which on one hand ensures a reproducible compressing of the coffee grounds in the basket or portafilter, and on the other hand has an enhanced ergonomic to avoid uncomfortable working, resulting in physical discomfort.

This object is solved by a coffee tamper according to claim 1.

By the invention, a coffee tamper is provided essentially consisting of circular punch unit and a top, said punch unit comprising a blind hole with an internal thread arranged in the center of the punch unit thereby forming a stay and a tamping surface on the opposite side of the blind hole and said top comprising a circular recess corresponding to the stay of the punch unit and a post comprising an external thread corresponding to the internal thread of the punch unit, or wherein said top comprising a blind hole with an internal thread arranged in the center of the top thereby forming a stay and said punch unit comprising a circular recess corresponding to the stay of the top and a post comprising an external thread corresponding to the internal thread of the top, said punch unit and top can be screwed together by the corresponding threads, wherein the outer diameter of the punch unit corresponds to the inner diameter of a basket or portafilter to receive coffee grounds and wherein the outer diameter of the top is larger than the outer diameter of the punch unit forming a rim when the top and the punch unit are screwed together, and wherein the top has an essentially flat handling surface.

By this design the coffee tamper according to the invention enables an adjustable depth of indentation for the punch unit depending on how deep the top is screwed onto the punch unit and limited by the rim of the top which will retain on a rim of the basket or portafilter when tamping the coffee grounds. Assuming that the basket or portafilter is filled with the same amount of coffee grounds the compression (total compression) of the coffee grounds will stay the same for each espresso beverage prepared when the tamper is punched until the limitation by the rim is reached. To amend the rate of compression (total compression), the punch unit of the tamper is screwed in or out of the top. Screw the punch unit into the top will decrease the total compression, while screwing it out will increase the total compression. Due to the essentially flat handling surface of the top, the tamper can be used with a flat hand pressing with the heel of the hand (thenar eminence), thereby avoiding ergonomic unfavorable force effects in the wrist joint of the acting hand.

The traditional tamper design requires the user to grip the handle whilst pushing vertically downwards. To do this in a controlled manner the user must be able to visually monitor the tamper to enable an application of force perpendicular to the longitudinal axis of the basket. To enable continual visual assessment the user typically has to extend their upper arm away from their body at the shoulder, requiring their forearm to hang vertically below the elbow. This unnatural position causes significant force on the shoulder, back and wrist. Since the invention allows the ball of the hand to apply the force, the user is able to keep their whole arm much closer to the body substantially increasing the mechanical advantage of the physical process, and therefore reducing the load on the body for the same loading of compressive force.

According to a preferred embodiment of the invention, the top comprises at least one grub screw bore hole in which a grub screw can be screwed to retain the top relative to the punch unit and to avoid an unintended turn of the punch unit, so that by tighten grub screw an unintended amendment of the compression rate (total compression) is avoided. When loosening the grub screw the total compression can easily be amended by screwing in or out the punch unit. Preferably, the grub screw is a hexagon socket screw (Allen key screw) or a torx screw.

According to another embodiment of the invention, retention of the punch unit is achieved by an incremental mechanism, with a sprung load and indentations. Such embodiment easily enables change of the total compression without making use of any additional tools, like e.g. an Allen key. Hence, according to this embodiment of the invention, the top and the punch unit interact by a notch mechanism to retain the top relative to the punch unit and to avoid turn of the punch unit, so that unintended amendment of the total compression is avoided. The notch mechanism may comprise at least three blind holes having sprung loaded ball pins and a corresponding number of indentations or recesses, both equally spaced and arranged along the circumference of facing surfaces of the punch unit and the top. For example, while outwards facing blind holes with the sprung loaded ball pins may be arranged in the upper area of the punch unit the top may comprise vertically extending indentations or recesses on the inner surface, i.e. the surface facing to the punch unit. When rotating the top relatively to the punch unit the sprung loaded ball pins will snap into the vertically extending recesses of the top, thereby locking the top in the snapped position. When applying a force greater that resilient force the top can be rotated further until the sprung loaded ball pins snap into another groove. According to another embodiment, the blind holes with the sprung loaded ball pins and vertical extending recesses are arranged in the interacting threads of the top and the punch unit, e.g. the blind holes in the top thread and the vertical extending recesses in the punch unit thread or the vertical extending recesses in the top thread and the blind holes in the punch unit thread. The above described notch mechanism can also be combined with the grub screw bore hole in which a grub screw can be screwed to retain the top relative to the punch unit.

Preferably, the coffee tamper can comprise a marked scale to indicate the height of the tamping, similar to that of a mechanical micrometer. Since the height of the tamping is in direct relationship to the total compression, the scale can be used as reference for repeatable consistent tamping results, even when the tamper should have been disassembled for maintenance reason.

According to another preferred embodiment of the invention, the punch unit comprises a lip seal. By the seal lip ingression of coffee grounds and/or moisture into the recess of the top or the blind hole can be avoided. This is beneficial in hygienic terms. Alternatively or additionally, the top can comprise a lip seal.

According to another embodiment, the top and/or the punch unit comprises a vent hole, to allow the air pressure to exhaust from the cavity between top and punch unit. Preferably, such vent hole is a filtered vent hole, like e.g. a hole filling hydrophilic foam plug.

According to another preferred embodiment of the invention, the top comprises chamfered edges. Having chamfered edges is beneficial in ergonomic terms to avoid unfavorable pressure marks on the palm of the hand of the user. Chamfered edges in the meaning of the invention are also filleted and/or curved edges.

Preferably, the punch unit of the inventive coffee tamper is made of one of stainless steel, brass, anodized or hard anodized aluminum, and food grade polymers, like e.g. polytetrafluoroethylene (PTFE). All of these materials are beneficial in hygienic terms since they are easy to clean, durable and are less sensitive bacteria contamination or fungi. In a more preferred embodiment at least the tamping surface of the punch unit comprises a bacteria resistant coating, like e.g. gold, silver or platinum coating. Such coating may be applied on a base material by galvanic coating techniques.

The top of the inventive coffee tamper can be made of the same material as the punch unit. However, for haptic or decorative reason the top may be made of a different material, like e.g. copper, plastics, metalized plastics, stone, or wood. It is especially preferable when the top is made of a material having a high heat capacity, so as the heat transfer actually warms up the top less per joule of heat (thermal energy), protecting the user's hand against hot parts of the basket or portafilter. Preferably, the thermal conductivity of the top should be low, so as to provide an insulating effect against heat conduction.

According to another embodiment of the invention, the top comprises an indication means to indicate a contact of the rim of the coffee tamper with the rim of the basket or portafilter. Preferably, the indication means indicates the contact by an acoustic and/or haptic signal. Even more preferred the indication means is a mechanical means indicating the contact by an acoustic and/or haptic signal. By the indication of the contact of the top with the rim of the basket or portafilter, useless excessive force on the tamper can be avoided and the user can stop the tamping when receiving the indication signal. Especially in loud environment, like coffee shops or bars, a haptic signal which will be received by the users acting hand is preferred.

In a further embodiment of the invention, the tamping surface has a convex contour, a concave contour, or a flat contour. The contour of the tamping surface has a direct influence on the distribution of the coffee grounds in the basket or portafilter. Depending on the water/steam outlet in the brewing unit of an espresso machine, it is beneficial when the tamped cake of coffee grounds is a little thicker in the center and a little thinner on the outside or a little thinner in the center and a little thicker on the outside. This can be achieved by a concave or convex contour of the tamping surface, respectively.

According to another embodiment of the invention, the punch unit comprises at least one groove in the outer side wall. Preferably, this groove is arranged in the lower part of the punch unit near by the tamping surface. The groove may have a depth within the range of between $\geq 0.1$ mm to $\leq 3$ mm, preferably within the range of between $\geq 0.15$ mm and $\leq 2$ mm, more preferably between $\geq 0.3$ mm to $\leq 1$ mm, like e.g. 0.35 mm, 0.36 mm, 0.37 mm, 0.38 mm, 0.39 mm or 0.4 mm. The edges of the groove may be chamfered with an angle in the range of between 65° and 25°, preferably between 60° and 30°, more preferably between 50° and 40°, like e.g. 42°, 43°, 44°, 45°, 46°, 47°, 48°, or 49°. The upper and the lower bevel may have different angles, while identical angles are preferred. The width of the groove may be in a range of between ¹/₁₀ to ⅓ of the overall punch unit height, preferably in a range of between ⅛ to ¼ of the overall punch unit height. The width of the groove may be in a range of between ≥1 mm and ≤10 mm, preferably in a range of between ≥2 mm and ≤8 mm, preferably between ≥3 mm and ≤7 mm, like e.g. 3.5 mm, 3.8 mm, 4.0 mm, 4.5 mm, 5.0 mm, 5.1 mm, 5.2 mm, 5.3 mm, 5.4 mm, 5.5 mm, 5.6 mm, 5.7 mm, 5.8 mm, 5.9 mm, or 6.0 mm. It is mandatory that the groove is arranged in way that at the lower end of the punch unit a rim will remain having approximately the same diameter as the overall punch unit. This rim may have a width in the range of between ≥0.2 mm and ≤1 mm, preferably between ≥0.3 mm and ≤0.8 mm, more preferably between ≥0.45 mm and ≤0.65 mm, like e.g. 0.46 mm, 0.47 mm, 0.48 mm, 0.49 mm, or 0.5 mm. The lower edge of such rim, i.e. the edge facing the tamping surface, should be a sharp edge not being broken or chamfered. Of cause, the punch unit may comprise more than one rim, like e.g. 2, 3, 4 or 5 rims. Preferably, if the punch unit comprises more than one rim the geometry of the rims is approximately identical with respect to width, depth, and beveled edges. However, the lower edge of the lowest rim, i.e. the edge with the tamping surface, should be a sharp edge not being broken or beveled. Surprisingly, it was found that by such rim a vacuum in the basket can be avoided and extraction of the tamper after finishing of the tamping is easier. Furthermore, a distortion of the firmly tamped surface while extracting can be avoided.

According to another embodiment of the invention, the groove arranged on the side of the punch unit does not run around the whole circumference of the punch unit but only covers sectional areas of the circumference. For example, if the circumference of the punch unit is given as U the punch unit may comprise 2 grooves each having a length of ¼ U and which are equally spaced and arranged along the circumference, or the punch unit may comprise 3 grooves each having a length of ⅙ U and which are equally arranged and spaced along the circumference. Hence, if the punch unit comprises n (wherein n>1) grooves the length of each groove may be ½ n U. By such arrangement tilting of the punch unit within the basket can be avoided.

The invention will be explained in more detail by the figures.

FIG. 1 shows a sectional view of an exemplary embodiment of the inventive coffee tamper (1);

FIG. 1a shows a sectional view of another exemplary embodiment of the inventive coffee tamper (1);

FIG. 2 shows a perspective view of the top (3) of the embodiment of FIG. 1;

FIG. 3 shows a perspective view of the punch unit (2) of the embodiment of FIG. 1;

Figure 4:
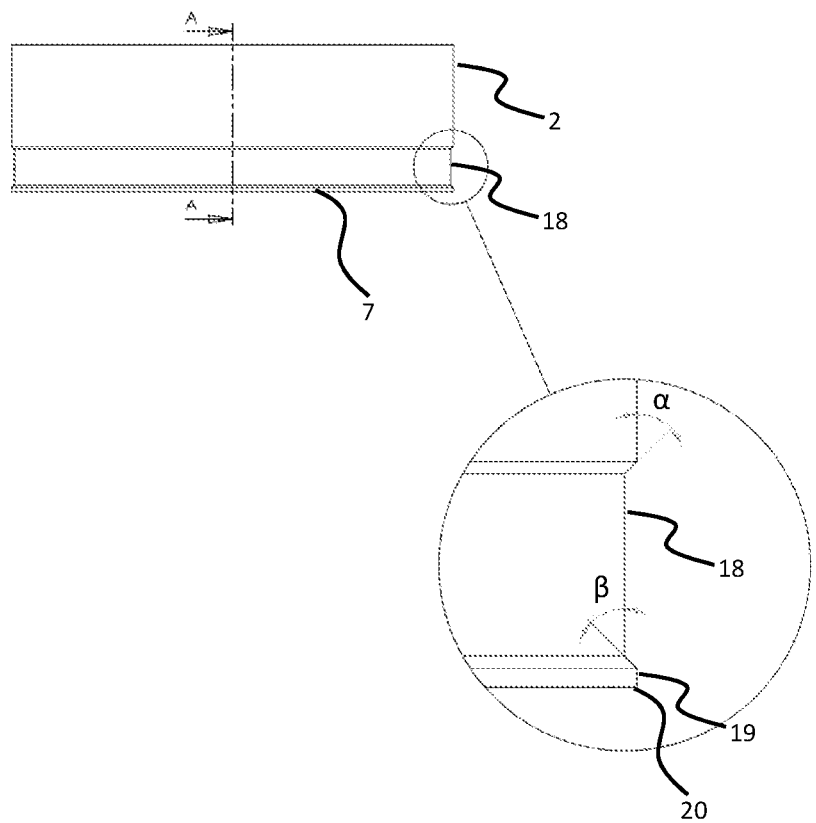
FIG. 4 shows a side view of a punch unit (2) having a groove (18)

In FIG. 1 a coffee tamper (1) essentially consisting of circular punch unit (2) and a top (3) is shown. The punch unit (2) comprises a blind hole (14) with an internal thread (4) arranged in the center of the punch unit (2) thereby forming a stay (13) and a tamping surface (7) on the opposite side of the blind hole (14). The top (3) comprises a circular recess (12) corresponding to the stay (13) of the punch unit (2) and a post (10) comprising an external thread (15) corresponding to the internal thread (4) of the punch unit (2). Alternatively, as shown in FIG. 1a, the top (3) may comprise the blind hole (14) with the internal thread (4) and the punch unit (2) may comprise the post (10) with the external thread (15) corresponding to the internal thread (4) of the top (3). The punch unit (2) and top (3) can be screwed together by the corresponding threads (4, 15). The outer diameter (16) of the punch unit (2) corresponds to the inner diameter of a basket or portafilter to receive coffee grounds so that an optimized compression of the coffee grounds can be achieved. The outer diameter (17) of the top (3) is larger than the outer diameter (16) of the punch unit (2). A rim (6) is achieved when the top (3) and the punch unit (2) are screwed together. By this rim (6) the compression of the coffee grounds will stay the same for each espresso beverage prepared when the tamper (1) is punched until the rim (6) contacts the rim of the basket or portafilter. To amend the rate of compression (total compression), the punch unit (2) of the tamper (1) is screwed in or out of the top (3). The top (3) has an essentially flat handling surface (8). By this flat handling surface (8) the tamper (1) can be used with a flat hand pressing with the heel of the hand (thenar eminence), thereby avoiding ergonomic unfavorable force effects in the wrist joint of the acting hand. The top (3) can comprise at least one grub screw bore hole (5) in which a grub screw can be screwed to retain the top relative to the punch unit. By this an unintended turn of the punch unit (2) can be avoided, so that by tightening the grub screw an unintended amendment of the total compression is avoided. When loosening the grub screw the total compression can easily be amended by screwing in or out the punch unit (2). Preferably, the grub screw is a hexagon socket screw (Allen key screw) or a torx screw. The punch unit (2) may further comprise a lip seal (9a). By the seal lip (9a) ingression of coffee grounds and/or moisture into the recess (12) of the top (3) or the blind hole (14) can be avoided. Alternatively or additionally, the top (3) can comprise a lip seal (9b). The top (3) preferably comprises chamfered edges (11).

FIG. 2 shows a perspective view of the top (3). The essential flat handling surface (8) is visible. Furthermore, a grub screw bore hole (5) is visible on the side wall of the top (3). Most preferably, the top (3) comprises 3 grub screw bore holes (5) evenly distributed on the circumference of the side wall. By this an optimized distribution of the force to fixate the position of the punch unit (2) is achieved.

FIG. 3 shows a perspective view of the punch unit (2). The blind hole (14) with the internal thread (4) is visible. Also, the stay (13) fitting into the recess of the top is visible.

FIG. 4 shows a side view of a punch unit (2) having a groove (18). The punch unit (2) comprises at least one groove (18) in the outer side wall. This groove (18) is arranged in the lower part of the punch unit (2) near by the tamping surface (7). The groove (18) has a depth within the range of between ≥0.1 mm to ≤3 mm, like e.g. 0.35 mm. The width of the groove (18) is in a range of between ¹/₁₀ to ⅓ of the overall punch unit (2) height, like e.g. 5.5 mm. The edges of the groove (18) are beveled with an angle ($\alpha$, $\beta$) in the range of between 65° and 25°, like e.g. 45°. The angles ($\alpha$, $\beta$) may vary independently from each other will it is preferred that the angles ($\alpha$, $\beta$) having the same values. At the lower end of the punch unit (2) a rim (19) remains having the same diameter as the overall punch unit. For example, if the overall diameter of the punch unit (2) is 58.65 mm the diameter of the rim (19) is 58.65 mm, too, while the diameter of the groove (18) is 58.00 mm. The rim (19) has a width in the range of between ≥0.2 mm and ≤1 mm, like e.g. 0.5 mm. The lower edge (20) of the rim (19), i.e. the edge with the tamping surface (7), is sharp edged and not being broken or beveled.

Figure 5:
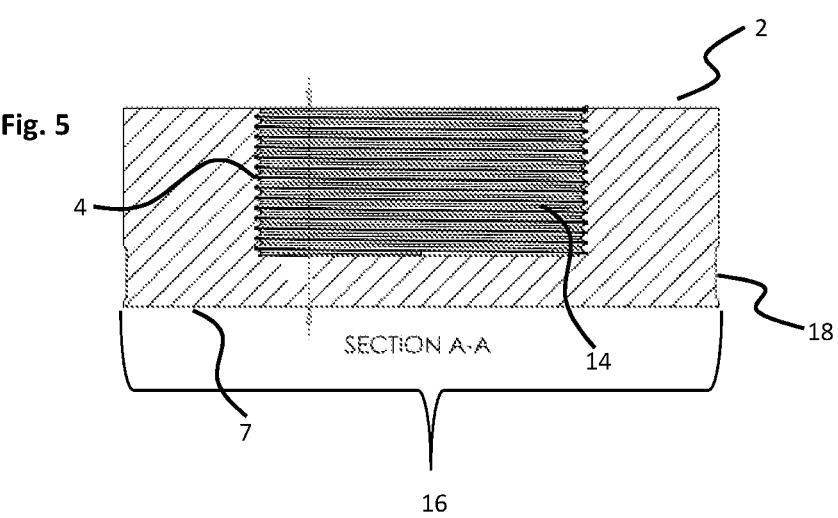
FIG. 5 shows a sectional view of a punch unit (2) having a groove (18)

FIG. 5 shows a sectional view of a punch unit (2) having a groove (18). The punch unit (2) comprises at least one groove (18) in the outer side wall.

Figure 6:
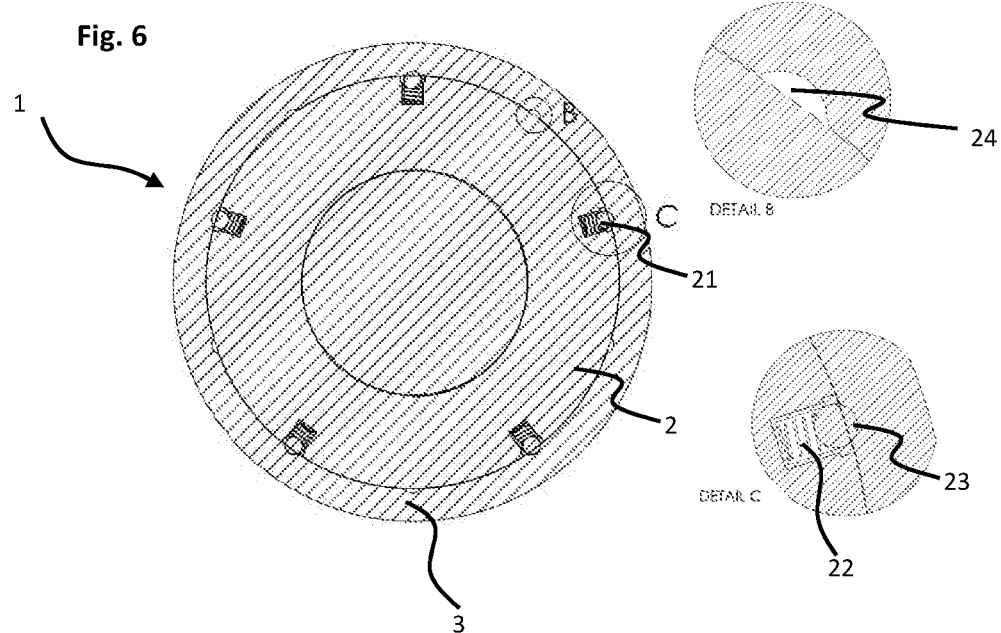
FIG. 6 shows a sectional view an embodiment of the inventive coffee tamper (1) having a notch mechanism.

FIG. 6 shows a sectional view of an embodiment of the inventive coffee tamper having a notch mechanism. Here, retention of the punch unit (2) is achieved by an incremental mechanism, with a sprung load and indentations. According to this embodiment of the invention, the top (3) and the punch unit (2) interact by a notch mechanism to retain the top (3) relative to the punch unit (2) and to avoid turn of the punch unit (2), so that unintended amendment of the total compression is avoided. The notch mechanism comprises blind holes (21) having sprung loaded (22) ball pins (23) and a corresponding number of indentations or recesses (24), both equally spaced and arranged along the circumference of facing surfaces of the punch unit (2) and the top (3). Outwards facing blind holes (21) with the sprung loaded ball pins (22, 23) are arranged in the upper area of the punch unit (2). The top (3) comprises vertically extending indentations or recesses (24) on the inner surface, i.e. the surface facing to the punch unit (2). When rotating the top (3) relatively to the punch unit (2) the sprung loaded ball pins (22, 23) will snap into the vertically extending recesses (24) of the top (3), thereby locking the top (3) in a snapped position. When applying a force greater than that resilient force the top (2) can be rotated further until the sprung loaded ball pins (22, 23) snap into another recess (24).

Figure 7:
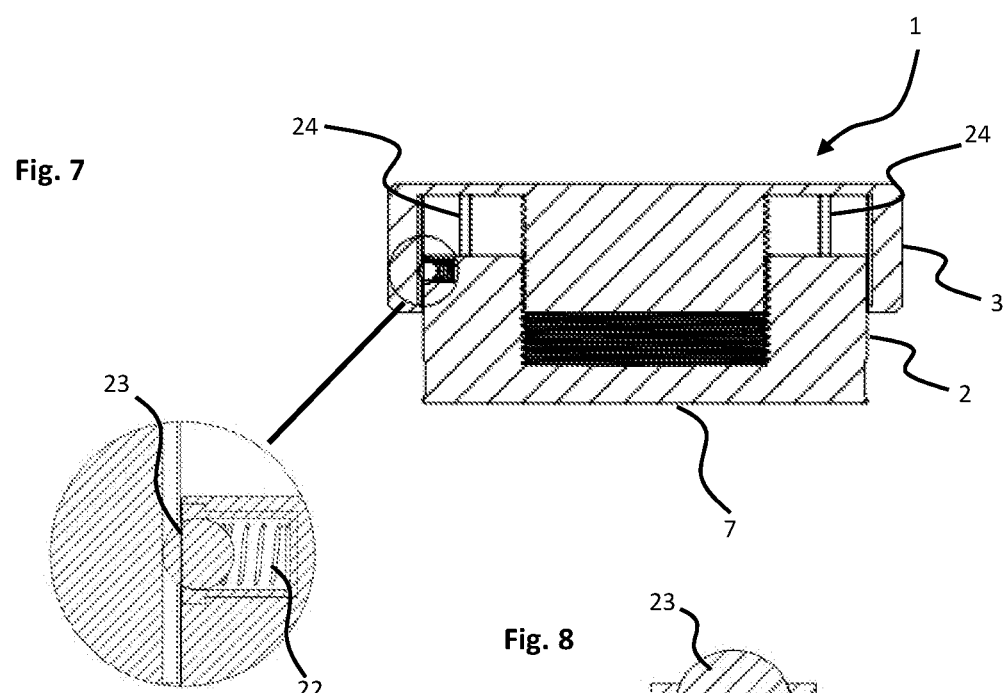
FIG. 7 shows a sectional view of an inventive coffee tamper having a notch mechanism.

FIG. 7 shows another sectional view of the inventive coffee tamper (1) having a notch mechanism. Here, the sprung loaded ball pin (22, 23) arranged in the upper part of the punch unit (2) is visible in a non-snapped position since the ball (23) is pressed against an even inner surface area of the top (3) having no indentation or recess. If the top (3) is turned relative to the punch unit (2) the sprung loaded ball pins (22, 23) will snap into one of the recesses (24).

Figure 8:
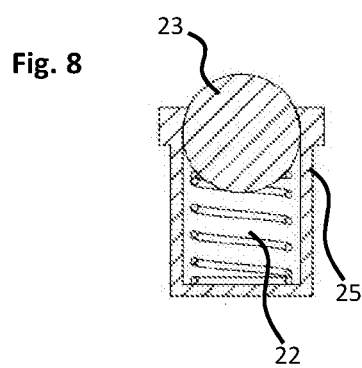
FIG. 8 shows a sprung load ball pins cartridge (25) to be used with an inventive coffee tamper.

FIG. 8 shows a cartridge (25) holding the sprung loaded ball pin (22, 23). By use of such cartridges the sprung loaded ball pins can easily be mounted into the blind holes.

LIST OF REFERENCE NUMBERS 1 coffee tamper
2 punch unit
3 top
4 internal thread
5 grub screw bore hole
6 rim
7 tamping surface
8 handling surface
9 (a/b) lip seal
10 post
11 chamfered edges
12 recess
13 stay
14 blind hole
15 external thread
16 outer diameter punch unit
17 outer diameter top
18 groove
19 rim
20 edge
21 blind hole
22 spring
23 ball pin
24 recess
25 sprung loaded ball pin cartridge

The invention claimed is:

1. A coffee tamper, comprising:
a circular punch unit and a top,
wherein either:
    said punch unit comprises a blind hole with an internal thread arranged in a center of the punch unit thereby forming a stay and a tamping surface on an opposite side of the blind hole, and
    said top comprises a circular recess corresponding to the stay of the punch unit and a post comprising an external thread corresponding to the internal thread of the punch unit, or
    said top comprises a blind hole with an internal thread arranged in a center of the top thereby forming a stay, and
    said punch unit comprises a circular recess corresponding to the stay of the top and a post comprising an external thread corresponding to the internal thread of the top,
and wherein:
    said punch unit and said top are configured to be screwed together by the corresponding threads, wherein an outer diameter of the punch unit corresponds to an inner diameter of a basket or portafilter to receive coffee grounds, and wherein an outer diameter of the top is larger than the outer diameter of the punch unit thereby forming a rim when the top and the punch unit are screwed together, the rim of the coffee tamper being configured to contact a rim of the basket or portafilter during use, and wherein an overall height of the top is less than an overall width of the coffee tamper.

2. The coffee tamper according to claim 1, wherein the top comprises at least one grub screw bore hole in which a grub screw can be screwed to retain the top relative to the punch unit and to avoid an unintended turn of the punch unit.

3. The coffee tamper according to claim 1, wherein the punch unit comprises a lip seal.

4. The coffee tamper according to claim 1, wherein the top comprises a lip seal.

5. The coffee tamper according to claim 1, wherein the top comprises chamfered edges.

6. The coffee tamper according to claim 1, wherein the punch unit is made of one of stainless steel, brass, anodized or hard anodized aluminum, and food grade polymers.

7. The coffee tamper according to claim 1, wherein, during use, the top is configured to provide an indication to a user that the rim of the coffee tamper is in contact with the rim of the basket or portafilter.

8. The coffee tamper according to claim 7, wherein the top is configured to provide the indication by an acoustic and/or haptic signal.

9. The coffee tamper according to claim 7, wherein the top is configured to provide the indication by a mechanical indicator.

10. The coffee tamper according to claim 1, wherein the tamping surface has a convex contour, a concave contour, or a flat contour.

11. The coffee tamper according to claim 1, wherein the punch unit comprises at least one groove in an outer side wall.

12. The coffee tamper according to claim 11, wherein U is a circumference of the punch unit and the punch unit comprises two grooves each having a length of ¼ U and which are equally spaced and arranged along the circumference.

13. The coffee tamper according to claim 1, wherein the coffee tamper comprises a notch mechanism for retention of the punch unit by an incremental mechanism.

14. The coffee tamper according to claim 13, wherein the notch mechanism comprises a spring load and indentations.

15. The coffee tamper according to claim 13, wherein the notch mechanism comprises at least one spring loaded ball pin cartridge arranged in a blind hole.

16. The coffee tamper according to claim 1, wherein an aspect ratio of the overall height of the top to the overall width of the coffee tamper is less than about 1.

\* \* \* \* \*